United States Patent
Healy et al.

(10) Patent No.: US 11,519,292 B2
(45) Date of Patent: Dec. 6, 2022

(54) NON-OPTICAL FLAME DETECTOR AND METHOD FOR A COMBUSTOR OF A TURBINE ENGINE

(71) Applicant: General Electric Company, Schenectady, NY (US)

(72) Inventors: Timothy Andrew Healy, Simpsonville, SC (US); Abhijit Prabhakar Kulkarni, Hyderabad (IN); Scott Arthur Day, Greenville, SC (US); John Rogers Huey, Greenville, SC (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 17/210,754

(22) Filed: Mar. 24, 2021

(65) Prior Publication Data
US 2022/0307385 A1    Sep. 29, 2022

(51) Int. Cl.
*G01M 15/14* (2006.01)
*F01D 21/12* (2006.01)
(Continued)

(52) U.S. Cl.
CPC ........... *F01D 21/12* (2013.01); *F01D 21/003* (2013.01); *F01D 21/14* (2013.01); *F02C 7/264* (2013.01);
(Continued)

(58) Field of Classification Search
CPC .................................................... G01M 15/14
See application file for complete search history.

(56) References Cited

U.S. PATENT DOCUMENTS

| 7,942,038 B2 | 5/2011 | Ziminsky et al. |
| 8,601,861 B1 | 12/2013 | Vershinin et al. |

(Continued)

FOREIGN PATENT DOCUMENTS

| DE | 102011051572 A1 | 1/2012 |
| EP | 2342498 B1 | 8/2016 |

(Continued)

OTHER PUBLICATIONS

EP Search Report for corresponding EP Application No. 22160739.3 dated Aug. 22, 2022, 7 pages.

*Primary Examiner* — Eric S. McCall
(74) *Attorney, Agent, or Firm* — James Pemrick; Charlotte Wilson; Hoffman Warnick LLC

(57) ABSTRACT

A method of detecting flame state of a combustor of a turbine engine. The method includes determining at least one of a first derivative and a second derivative of a compressor discharge pressure of a compressor of the turbine engine; determining at least one of a first derivative and a second derivative of a gas turbine exhaust gas temperature of the exhaust gases output by the turbine engine; determining at least one of a first derivative and a second derivative of a gas turbine shaft/rotor speed of the turbine engine; determining at least one of a first derivative and a second derivative of combustor dynamic pressure monitoring; and determining a flame state of a combustor of the turbine engine based on the combustor dynamic pressure monitoring, the determined derivatives of the combustion dynamics, compressor discharge pressure, gas turbine shaft/rotor speed, and gas turbine exhaust gas temperature of the exhaust gases.

20 Claims, 5 Drawing Sheets

(51) Int. Cl.
  *F02C 7/264*   (2006.01)
  *F01D 21/14*   (2006.01)
  *F01D 21/00*   (2006.01)
  *G01M 15/05*   (2006.01)
  *G01M 15/10*   (2006.01)

(52) U.S. Cl.
  CPC ............ *G01M 15/05* (2013.01); *G01M 15/10* (2013.01); *G01M 15/14* (2013.01); *F05D 2240/35* (2013.01); *F05D 2260/80* (2013.01); *F05D 2260/99* (2013.01); *F05D 2270/303* (2013.01); *F05D 2270/304* (2013.01); *F05D 2270/3013* (2013.01)

(56) References Cited

U.S. PATENT DOCUMENTS

| | | |
|---|---|---|
| 9,494,493 B2 | 11/2016 | Claussen et al. |
| 9,599,527 B2 | 3/2017 | Claussen et al. |
| 9,791,150 B2 | 10/2017 | Claussen et al. |
| 2008/0053087 A1* | 3/2008 | Swenson ............... F02D 41/221 60/599 |
| 2012/0088197 A1 | 4/2012 | Byrd et al. |
| 2015/0068294 A1 | 3/2015 | Claussen et al. |
| 2018/0016992 A1 | 1/2018 | Kalya et al. |

FOREIGN PATENT DOCUMENTS

| | | |
|---|---|---|
| EP | 2617964 B1 | 3/2019 |
| JP | 2012082824 A | 4/2012 |
| WO | 2014166680 A1 | 10/2014 |

\* cited by examiner

NON-OPTICAL FLAME DETECTOR AND METHOD FOR A COMBUSTOR OF A TURBINE ENGINE

BACKGROUND

The disclosure relates generally to flame detection methods and systems. In particular, the disclosure relates to flame detection methods and systems in a gas turbine.

Turbine engines typically include a flame detector that monitors a state of a flame in a combustor of the turbine engine. Most flame state detectors are optical detectors. Unfortunately, it is difficult for most such optical detectors to withstand the extreme operating conditions that exist in or adjacent a combustor of a turbine engine without cooling of some sort. Those optical detectors that can withstand the extreme operating conditions without cooling are quite expensive.

Many optical flame state detectors require water or liquid cooling in order to operate in or adjacent a combustor of a turbine engine. Unfortunately, cooling fluid leaks can be quite damaging to the surrounding components. Thus, even providing cooling to an optical flame state detector can be somewhat risky.

BRIEF DESCRIPTION

All aspects, examples and features mentioned below can be combined in any technically possible way.

An aspect of the disclosure provides a method of determining a flame state of a combustor of a turbine engine, comprising: determining at least one of a first derivative and a second derivative of a compressor discharge pressure of a compressor of the turbine engine; determining at least one of a first derivative and a second derivative of a gas turbine exhaust gas temperature of the exhaust gases output by the turbine engine; determining at least one of a first derivative and a second derivative of a gas turbine shaft/rotor speed of the turbine engine; determining a combustor dynamic pressure monitoring status; and determining a flame state of a combustor of the turbine engine based on the combustor dynamic pressure monitoring status, and the determined derivatives of the compressor discharge pressure, gas turbine shaft/rotor speed, and gas turbine exhaust gas temperature of the exhaust gases.

Another aspect of the disclosure includes any of the preceding aspects, and wherein the determining a flame state of the combustor includes determining that a flame has ignited in the combustor whether at least two of the first derivative of the compressor discharge pressure of the compressor, the first derivative of the gas turbine exhaust gas temperature, and the first derivative of the gas turbine shaft/rotor speed are positive during a predetermined period of time, and at least one of the first derivative of the compressor discharge pressure of the compressor, the first derivative of the exhaust gas temperature, and the first derivative of the gas turbine shaft/rotor speed is greater than a threshold value.

Another aspect of the disclosure includes any of the preceding aspects, and wherein the step of determining a flame state of the combustor includes determining that a flame has ignited in the combustor whether at least two of the first derivative of the compressor discharge pressure of the compressor, the first derivative of the temperature of the exhaust gases, and the first derivative of the gas turbine shaft/rotor speed are positive during at least portions of a predetermined period of time, and wherein the gas turbine shaft/rotor speed is greater than a preset threshold value, the first derivative of the compressor discharge pressure of the compressor is greater than a first threshold value and the first derivative of the exhaust gas temperature is greater than a second threshold value during the predetermined period of time.

Another aspect of the disclosure includes any of the preceding aspects, and wherein the step of determining a flame state of the combustor includes determining that a flame has ignited in the combustor whether at least two of the first derivative of the compressor discharge pressure of the compressor and the first derivative of the exhaust gas temperature of the exhaust gases, and the first derivative of the gas turbine shaft/rotor speed are positive during at least a portion of the same predetermined period of time.

Another aspect of the disclosure includes any of the preceding aspects, and wherein the step of determining a flame state of the combustor includes determining that a flame has ignited in the combustor whether the first derivative of the compressor discharge pressure of the compressor is positive during a first portion of a predetermined period of time and the first derivative of the exhaust gas temperature of the exhaust gases is positive during a second portion of the predetermined period of time, the second portion being subsequent to the first portion.

Another aspect of the disclosure includes any of the preceding aspects, and wherein the first determining step includes determining the first and second derivatives of the compressor discharge pressure of the compressor, wherein the second determining step includes determining the first and second derivatives of the exhaust gas temperature of the exhaust gases output by the turbine engine, wherein the third determining step includes determining first and second derivatives of the gas turbine shaft/rotor speed and wherein the step of determining a flame state of a combustor of the turbine engine is based on the determined first and second derivatives of the compressor discharge pressure, exhaust gas temperature of the exhaust gases, and the first derivative of the gas turbine shaft/rotor speed.

Another aspect of the disclosure includes any of the preceding aspects, and wherein the step of determining a flame state of the combustor includes determining that a flame has ignited in the combustor whether at least two of the first and second derivatives of the compressor discharge pressure of the compressor, the first and second derivatives of the exhaust gas temperature of the exhaust gases, and the first and second derivatives of the gas turbine shaft/rotor speed are positive over portions of a predetermined period of time.

Another aspect of the disclosure includes any of the preceding aspects, and, wherein the step of determining a flame state of the combustor includes determining that a flame has ignited in the combustor whether the first and second derivatives of the compressor discharge pressure of the compressor are positive and above threshold values during a first portion of a predetermined period of time, and whether the first and second derivatives of the exhaust gas temperature of the exhaust gases are positive and above threshold values during a second portion of the predetermined period of time.

Another aspect of the disclosure includes any of the preceding aspects, and, wherein the step of determining a flame state of the combustor includes determining that a flame has been extinguished in the combustor whether at least two of the first and second derivatives of the compressor discharge pressure of the compressor and the first and second derivatives of the exhaust gas temperature of the exhaust gases are negative over at least portions of a predetermined period of time.

Another aspect of the disclosure includes any of the preceding aspects, and wherein the step of determining a flame state of the combustor includes determining that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during portions of a predetermined period of time, and at least one of the first derivative of the compressor discharge pressure of the compressor, the first derivative of the exhaust gas temperature of the exhaust gases, and the first derivative of gas turbine shaft/rotor speed is below a threshold value.

Another aspect of the disclosure includes any of the preceding aspects, and wherein the step of determining a flame state of the combustor includes determining that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during portions of a predetermined period of time, the first derivative of the compressor discharge pressure of the compressor is smaller than a first threshold value during a portion of the predetermined period of time, and the first derivative of the exhaust gas temperature of the exhaust gases is smaller than a second threshold value during a portion of the predetermined period of time.

An aspect of the disclosure provides a system for determining a flame state of a combustor of a turbine engine, the system comprising: a pressure change determining unit; a temperature change determining unit; a gas turbine shaft/rotor speed unit; combustor dynamic pressure monitoring; a flame state determining unit; and a non-transitory computer-readable medium comprising computer-executable instructions for operating a gas turbine, the instructions including instruction for determining at least one of a first derivative and a second derivative of a compressor discharge pressure of the compressor of the turbine engine; determining at least one of a first derivative and a second derivative of an exhaust gas temperature of the exhaust gases output by the turbine engine; determining at least one of a first derivative and a second derivative of a combustion gas turbine shaft/rotor speed; determining at least one of a first derivative and a second derivative of combustion monitoring, and determining a flame state of a combustor of the turbine engine based on the determined derivatives of the combustion monitoring, compressor discharge pressure of the compressor, the determined exhaust gas temperature of the exhaust gases, and the determined derivatives of the gas turbine shaft/rotor speed.

An aspect of the disclosure provides a system for determining a flame state of a combustor of a turbine engine, comprising a pressure change determining unit that determines at least one of a first derivative and a second derivative of the compressor discharge pressure of the compressor of the turbine engine; a temperature change determining unit that determines at least one of a first derivative and a second derivative of the exhaust gas temperature of the exhaust gases output by the turbine engine; a gas turbine shaft/rotor speed unit that determines at least one of a first derivative and a second derivative of the gas turbine shaft/rotor speed; and a combustor dynamic pressure monitoring unit that determines at least one of a first derivative and a second derivative of combustion dynamics; wherein a flame state determining unit that determines a flame state of a combustor of the turbine engine based on outputs of the pressure change determining unit, the temperature change determining unit, the gas turbine shaft/rotor speed and the combustor dynamic pressure monitoring unit.

Another aspect of the disclosure includes any of the preceding aspects, and wherein the flame state determining unit determines that a flame has ignited in the combustor whether at least two of the first derivative of the compressor discharge pressure of the compressor, the first derivative of the exhaust gas temperature of the exhaust gases, and the first derivative of the gas turbine shaft/rotor speed are positive during at least portions of a predetermined period of time, and at least one of the first derivative of the compressor discharge pressure of the compressor, the first derivative of the exhaust gas temperature of the exhaust gases, and the first derivative of the gas turbine shaft/rotor speed is greater than a threshold value.

Another aspect of the disclosure includes any of the preceding aspects, and, wherein the flame state determining unit determines that a flame has ignited in the combustor whether at least two of the first derivative of the compressor discharge pressure of the compressor the first derivative of the exhaust gas temperature of the exhaust gases, and the first derivative of the gas turbine shaft/rotor speed are positive during at least portions of a predetermined period of time, the first derivative of the compressor discharge pressure of the compressor is greater than a first threshold value, the first derivative of the exhaust gas temperature of the exhaust gases is greater than a second threshold value, and the first derivative of the gas turbine shaft/rotor speed is greater than a third threshold value.

Another aspect of the disclosure includes any of the preceding aspects, and wherein the flame state determining unit determines that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during at least portions of a predetermined period of time, and at least one of the first derivative of the compressor discharge pressure of the compressor, the first derivative of the exhaust gas temperature of the exhaust gases, and the first derivative of the gas turbine shaft/rotor speed is lower than a threshold value.

Another aspect of the disclosure includes any of the preceding aspects, and wherein the flame state determining unit determines that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during at least portions of a predetermined period of time, the first derivative of the compressor discharge pressure of the compressor is lower than a first threshold value during a portion of the predetermined period of time, and the first derivative of the exhaust gas temperature of the exhaust gases is lower than a second threshold value during a portion of the predetermined period of time.

Another aspect of the disclosure includes any of the preceding aspects, and wherein the pressure change determining unit also determines the first and second derivatives of the compressor discharge pressure of the compressor, wherein the temperature change determining unit determines both the first and second derivatives of the exhaust gas temperature of the exhaust gases, and wherein the flame state determining unit determines a flame state of a combustor of the turbine engine based on the determined first and second derivatives of the compressor discharge pressure of the compressor, the temperature of the exhaust gas gases, and the gas turbine shaft/rotor speed.

Another aspect of the disclosure includes any of the preceding aspects, and wherein the flame state determining unit determines that a flame has ignited in the combustor whether at least two of the first and second derivatives of the compressor discharge pressure of the compressor, the first and second derivatives of the exhaust gas temperature of the exhaust gases, and the first and second derivatives of the gas turbine shaft/rotor speed are positive during at least portions of a predetermined period of time.

Another aspect of the disclosure includes any of the preceding aspects, and wherein the flame state determining unit determines that a flame has been extinguished in the combustor whether at least two of the first and second derivatives of the compressor discharge pressure of the compressor, the first and second derivatives of the exhaust gas temperature of the exhaust gases, and the first and second derivatives of the gas turbine shaft/rotor speed are negative during at least portions of a predetermined period of time.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
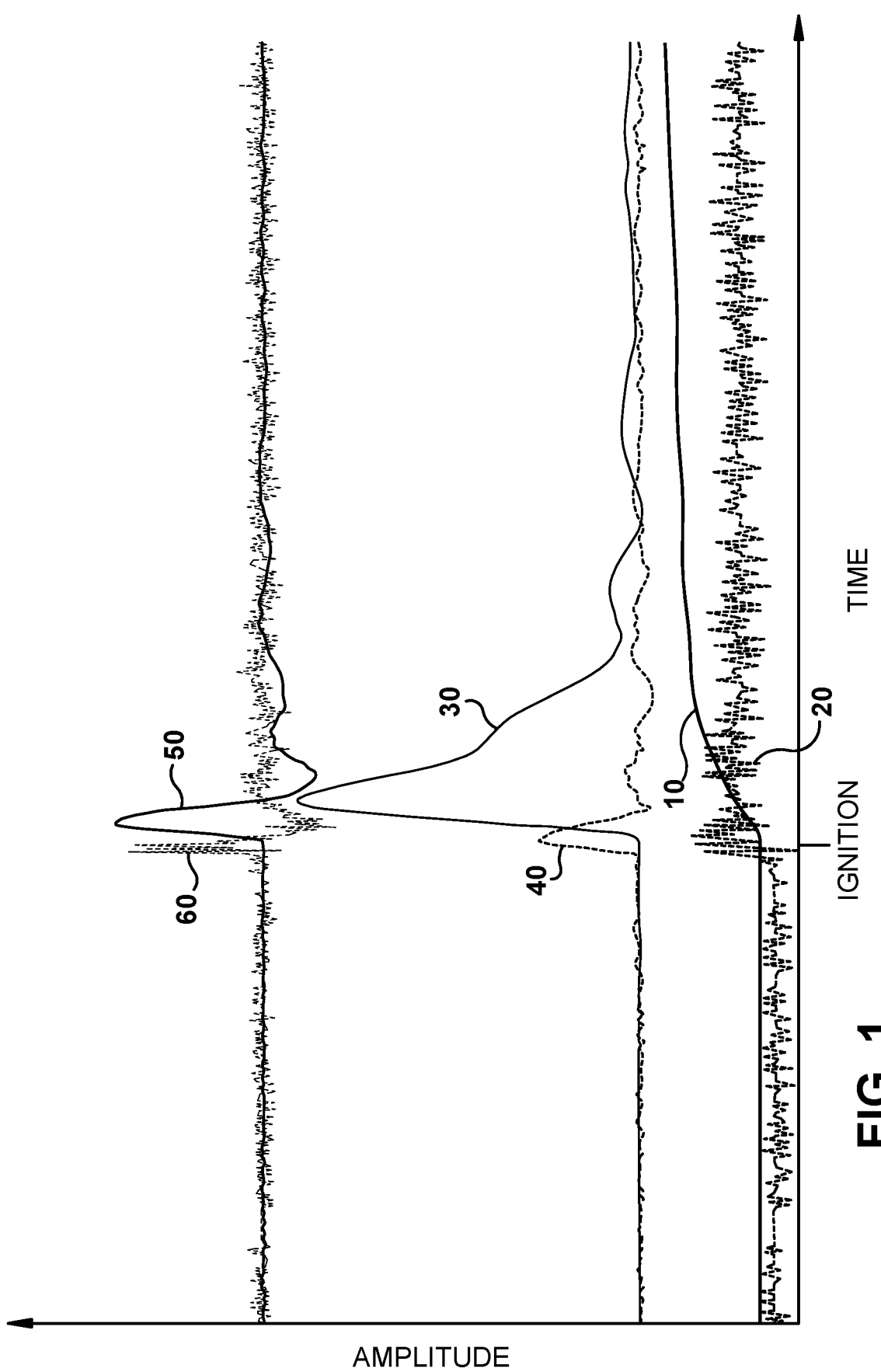
FIG. 1 is a diagram illustrating how the output pressure of a compressor, first and second derivatives of the output pressure of the compressor, the temperature of exhaust gases of a turbine engine, and first and second derivatives of the temperature of the exhaust gases of a turbine engine change when a flame is ignited in a combustor of the turbine engine, as embodied by the disclosure.

As an initial matter, in order to clearly describe the current technology it will become necessary to select certain terminology when referring to and describing relevant machine components within a gas turbine, including its controls. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As embodied by the disclosure, in certain aspects, characteristics of the compressor output pressure and the exhaust temperature can be used to determine if a flame has ignited in the combustor, or if a flame has been extinguished ("loss of flame"). Thus, in certain aspects of the embodiments, monitoring these values and making appropriate judgments about their characteristics makes it possible to understand optical flame conditions.

FIG. 1 illustrates how the output pressure of a compressor of a turbine engine, the temperature of exhaust gases of the turbine engine and first and second derivatives of both those values change during a flame ignition event. The line identified with reference number 10 in FIG. 1 illustrates how the exhaust gas temperature of a turbine engine changes over time as a flame is first ignited in the combustor of the turbine engine. The line identified with reference number 20 illustrates how the compressor output pressure varies over time as a flame is first ignited in a turbine engine. The line identified with reference number 30 in FIG. 1 indicates the rate of change, or the first derivative, of the exhaust gas temperature during a flame ignition event, and the line identified with reference number 40 represents the rate of change, or first derivative, of the compressor output pressure during ignition. The line identified with reference number 50 represents the second derivative (i.e., the rate of change of the rate of change) of the exhaust gas temperature, and the line identified with reference number 60 represents the second derivative of the compressor output pressure.

As is apparent in FIG. 1, the compressor output pressure 20 rapidly increases as soon as the flame is ignited. As is also apparent in FIG. 1, the exhaust gas temperature 10 steadily rises after flame ignition. The rise in exhaust gas temperature 10 does not begin to occur until a small time delay has elapsed after flame ignition. However, the rise in exhaust gas temperature 10 continues long after flame ignition has occurred.

The first and second derivatives of the exhaust temperature 30 and the compressor discharge pressure 40 have a particular relationship with one another during normal operation of the turbine. They have a different relationship during ignition and flame out.

During normal operation of the turbine, in certain aspects of the embodiments, when the rate of change, or first derivative, of the exhaust gas temperature 30 can be increasing, the rate of change, or first derivative, of the compressor discharge pressure 40 may be decreasing. In other words, during normal operation of the turbine, when the rate of change, or first derivative, of the exhaust gas 30 may be decreasing, the rate of change, or first derivative, of the compressor discharge pressure 40 can be increasing. This relationship is reflected by the portion of the lines identified with reference numbers 30 and 40 in FIG. 1 that occur after flame ignition. The relationship between the second derivative of the exhaust gas temperature and the second derivative of the compressor output pressure follows the same trend.

However, during a flame ignition event, the rate of change (first derivative) of the exhaust gas temperature 30 and the rate of change (first derivative) of the compressor output pressure 40 both increase. This relationship is reflected by the portions of the lines identified with reference numbers 30 and 40 at time of and immediately after the flame ignition event. Because the two rates of change only increase together during flame ignition, and immediately thereafter, any time that one detects that both rates of change (first derivatives) are positive, and relatively high values, one can determine that flame ignition has occurred.

The same is true for the second derivatives of the exhaust gas temperature and the compressor output pressure. In other words, if one determines that the second derivatives of the exhaust gas temperature and the compressor output pressure are both positive and relatively high values over a small period of time, one can determine that a flame ignition event has occurred.

Figure 2:
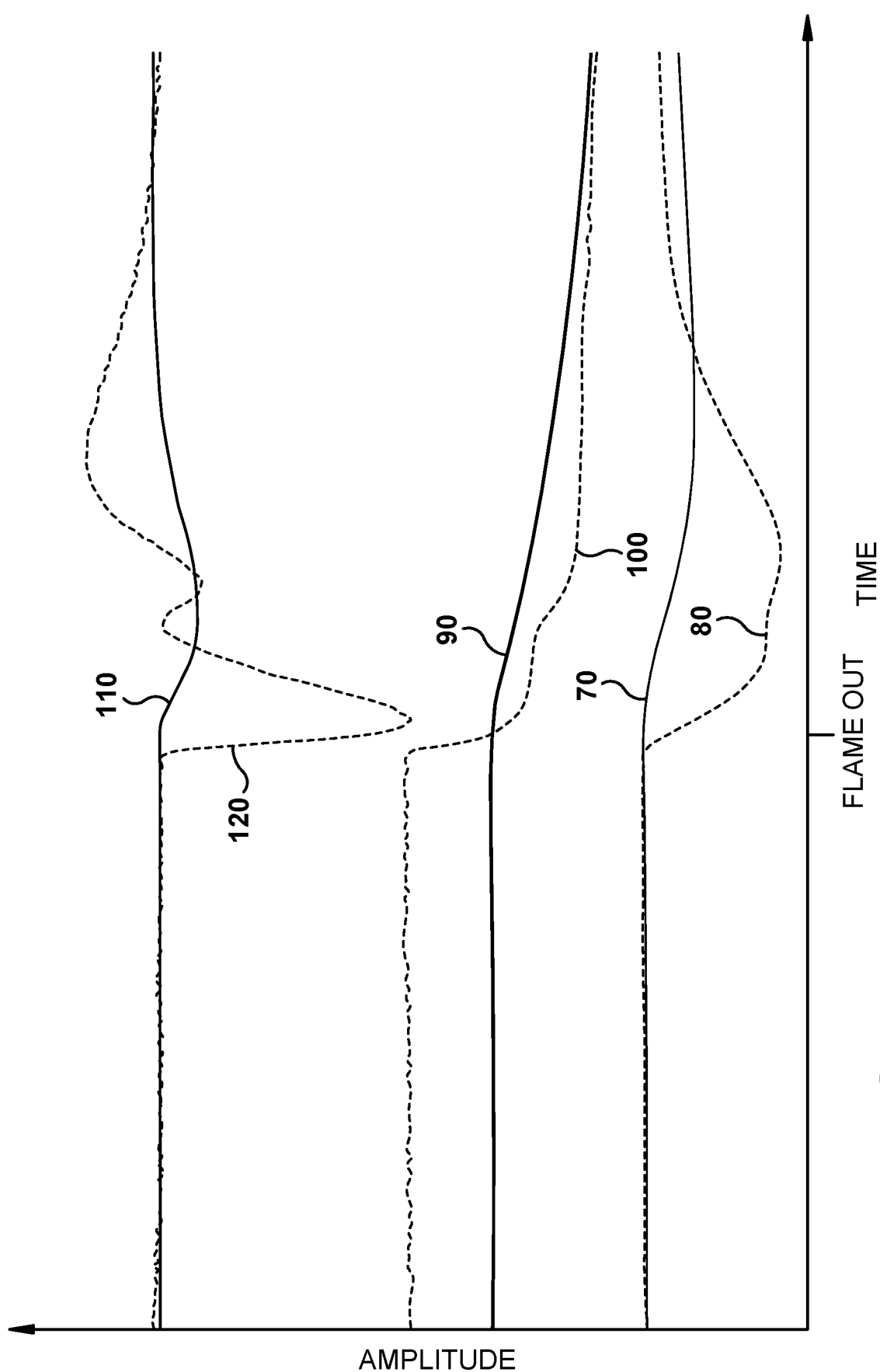
FIG. 2 is a diagram illustrating how the output pressure of a compressor, first and second derivatives of the output pressure, the temperature of exhaust gases of a turbine engine, and first and second derivatives of the temperature of the exhaust gases of a turbine engine change when a flame is extinguished in a combustor of the turbine engine, as embodied by the disclosure.

FIG. 2 illustrates how the compressor output pressure and exhaust gas temperature, and first and second derivatives of those values, vary during a flame out or flame extinguishing event. The line identified with reference number 70 indicates how the exhaust gas temperature changes over time when the flame in a combustor is extinguished. The line identified with reference number 80 indicates how the compressor output pressure changes over time when the flame is extinguished. The line identified with reference number 90 illustrates the rate of change of the exhaust gas temperature, which is a first derivative of the exhaust gas temperature 70, and the line identified with reference number 100 illustrates the rate of change of the compressor output pressure, which is a first derivative of the compressor output pressure 80. The line identified with reference number 110 illustrates the second derivative of the exhaust gas temperature 70, and the line identified with reference number 120 illustrates the second derivative of the compressor output pressure 80.

When in certain aspects of the embodiments, the flame is extinguished, the first and second derivatives of the exhaust gas temperature and the compressor output pressure both are decreasing or negative. Thus, when one detects that the first and/or second derivatives of both the exhaust gas temperature and compressor output pressure are decreasing or negative, and below certain threshold values, one can determine that the flame has been extinguished ("loss of flame").

Systems and methods for determining when a flame in a combustor of a turbine engine has first ignited, or has been extinguished, monitor characteristics of the combustor dynamic pressure, compressor output pressure, and the exhaust gas temperature. The first and second derivatives of those values are also determined. When simultaneous indications (as described herein) of these monitored characteristics match simultaneously, an indication of flame ignition or loss of flame (or failure to ignite) can be produced, as discussed hereinafter. Moreover, systems and methods, as embodied by the disclosure, can provide an indication of flame ignition or loss of flame (or failure to ignite). This indication can also be provided during partial speed events. The method and system, as embodied by the disclosure, looks for trends that match the patterns illustrated in FIGS. 1 and 2.

Figure 3:
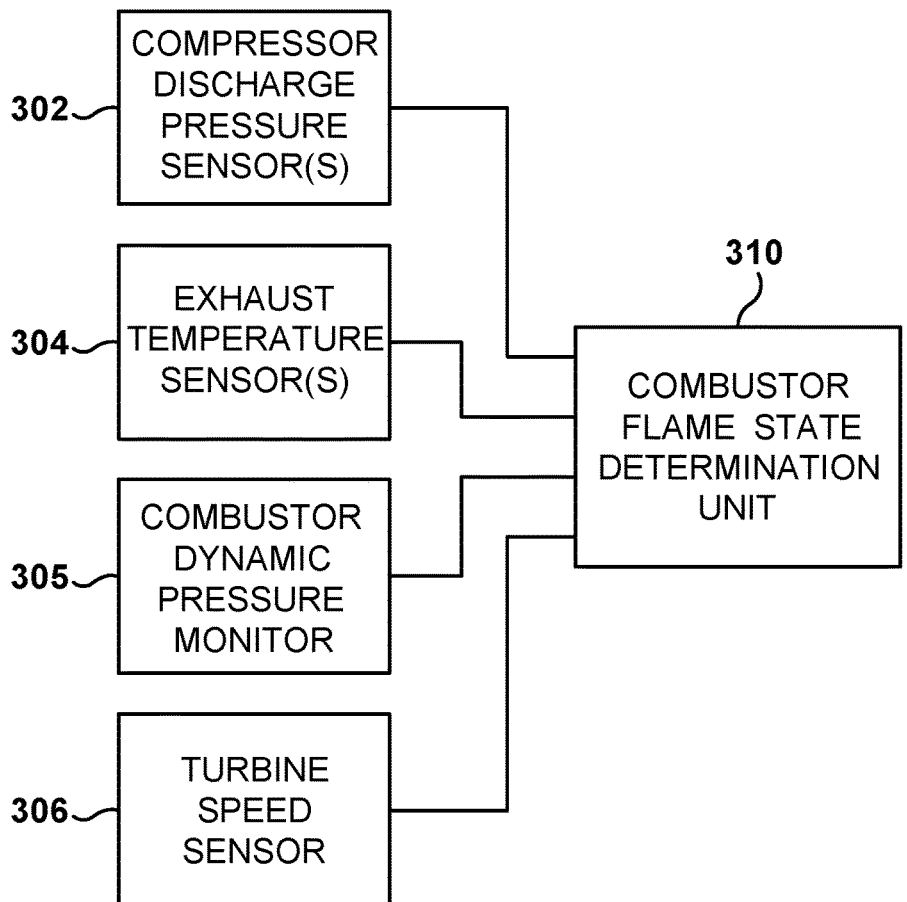
FIG. 3 is a block diagram illustrating elements of system that can be used to determine a flame state of a combustor of a turbine engine, as embodied by the disclosure.

FIG. 3 illustrates a system that is capable of determining when a combustor flame has been ignited or been extinguished ("loss of flame"), as embodied by the disclosure. In one aspect, the system includes a combustor flame state determination unit 310, which is operatively coupled to one or more compressor discharge pressure (CPD) sensors 302 and one or more exhaust gas temperature (TTXM) sensors 304. Combustor flame state determination unit 310 is further operatively coupled to a combustion dynamics monitor (CDM) 305. Additionally, combustor flame state determination unit 310 may also be operatively coupled to one or more turbine shaft/rotor speed (TNH) sensors 306, and/or other sensors. Shaft/rotor speed may be calculated in terms of their absolute values, radial values, and/or any conceivable expression.

Compressor discharge pressure sensors 302 may sense the pressure of compressed air at the output of the compressor, or at one or more stages within the compressor. Alternatively, or in addition, one or more sensors may be provided within a combustor of the turbine engine, which receives the compressed air produced by the compressor. Multiple signals from multiple pressure sensors could be operatively coupled to the combustor flame state determination unit 310, and the combustor flame state determination unit may calculate a compressor output pressure using those multiple input signals. Alternatively, the signals from multiple pressure sensors could be processed by a sensor system, and a single compressor output pressure value could be provided to the combustor flame state determination unit 310.

Combustion dynamics, which combustion dynamics monitor 305 analyzes, refers to the combustion process inside the combustion "can" and "liner." When fuel is burned, there may be a pressure increase. Depending on the design of combustor, fuel nozzles, liner, and other hot gas path components of a gas turbine, a combustion process can be subject to pressure oscillations or pulsations. In fact, the combustion process may be nonlinear and will produce dynamic pressure oscillations, especially when confined to a fixed volume, as in a gas turbine combustion can/chamber. The amplitude of the dynamic pressure oscillation may be low or relatively high. These dynamic oscillations or pulsations may even cause or indicate loss of flame (LOF).

Likewise, a single exhaust gas temperature sensor may be provided, or multiple exhaust gas temperature sensors 304 could be positioned at various different locations. If multiple sensors are provided, they may all be operatively connected to combustor flame state determination unit 310. Combustor flame state determination unit 310 may calculate an average or median exhaust gas temperature from the signals produced by sensors. Alternatively, an average or median exhaust gas temperature signal, which is generated from the data produced by multiple sensors, may be provided to combustor flame state determination unit 310.

Figure 4:
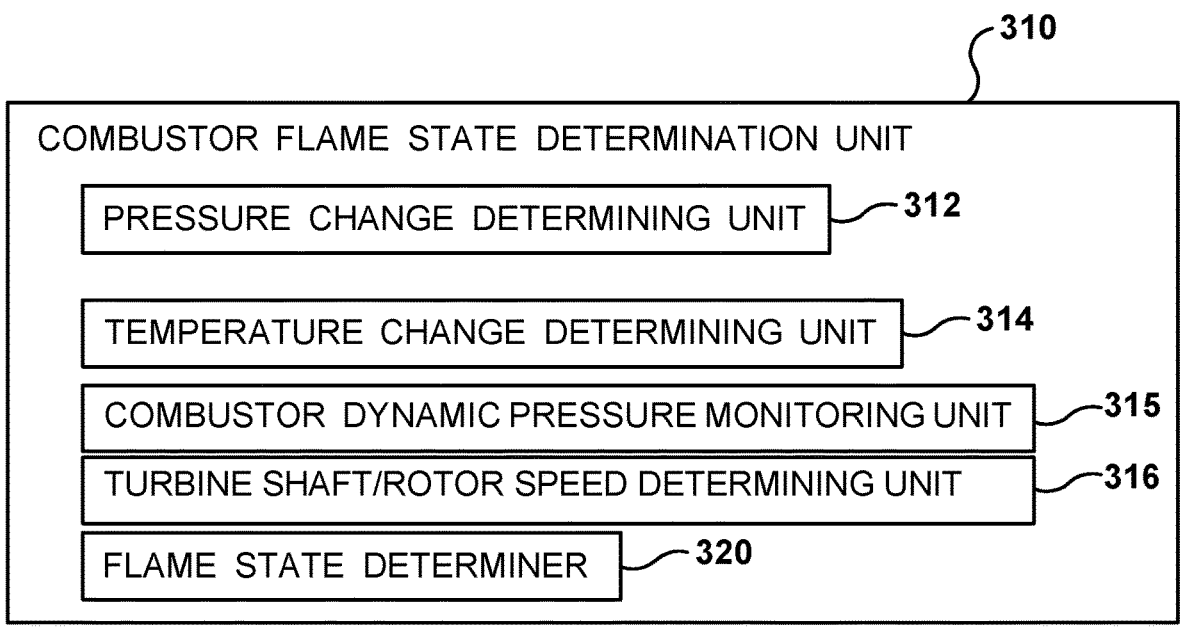
FIG. 4 is a diagram illustrating elements of a flame state determination unit that can determine a flame state of a combustor of a turbine engine, as embodied by the disclosure.

Some of the elements of combustor flame state determination unit 310 are illustrated in FIG. 4. Combustor flame state determination unit 310 could be implemented using software running on a general purpose computer. In this instance, the modules or units within combustor flame state determination unit 310 would be implemented as various software modules. Alternatively, one or more of the units could be implemented as a combination of software and specific circuit elements. In still other embodiments, some or all of the modules or units of combustor flame state determination unit 310 may be implemented as circuits or application specific integrated circuits.

As illustrated in FIG. 4, combustor flame state determination unit 310 includes a pressure change determination unit 312. Pressure change determination unit 312 monitors compressor output pressure and determines if compressor output pressure is increasing or decreasing over time. Pressure change determining unit 312 may also calculate the first and second derivatives of the compressor output pressure.

Likewise, a gas turbine exhaust temperature change determining 314 monitors the exhaust gas temperature and determines if the exhaust gas temperature is increasing or decreasing over time. Temperature change determining unit 314 may also calculate the first and second derivatives of the exhaust gas temperature.

Combustor flame state determination unit 310 also includes combustor dynamic pressure monitoring unit 315. Combustor dynamic pressure monitoring unit 315 monitors a status of the gas turbine combustion process. A combustion process can be subject to pressure dynamic oscillations or pulsations.

Additionally, combustor flame state determination unit 310 includes a turbine shaft/rotor speed determining unit 316. Turbine shaft/rotor speed determining unit 316 monitors turbine shaft/rotor speed determining if a turbine shaft/rotor speed is less than the threshold value of 90% of its desired value. Further, turbine shaft/rotor speed determining unit 316 may also calculate the first and second derivatives of the turbine shaft/rotor speed.

Also, combustor flame state determination unit 310 is provided with a synthesized or simplified indicator, SMP 307. Indicator SMP 307 can provide an indication that is directly tied to sensor monitoring. Indicator SMP 307 references negative derivatives of compressor pressure discharge, gas turbine exhaust temperature, and gas turbine shaft/rotor speed (and if gas turbine shaft/rotor speed is less than 90% of its desired value) to indicate possible loss of flame or loss of flame.

Indicator SMP 307 is a sensor-based indicator, and in fact is a multiple sensor-based indicator. Indicator SMP 307, as embodied by the disclosure, can provide flame state indications if one or more sensors are inoperable or sensors are faced with low signal to noise ratio events, such as part-speed loss. For example, and in no manner limiting of the embodiments, SMP 307 can provide an indication of LOF in part speed cases with low event signal to noise ratios. Also, SMP 307 can provide an indication of LOF in part speed cases with negative derivatives on CPD, TTXM, and THN.

With reference to FIG. 4 combustor flame state determination unit 310 additionally includes a flame state determiner 320. Flame state determiner 320 makes a conclusion if a gas turbine flame is lite, ignited, or that a loss of flame has occurred. Flame state determiner 320, as described hereinafter, utilizes the information produced by some of compressor pressure change determining unit 312, a turbine shaft/rotor speed determining unit 306, gas turbine exhaust temperature change determining 314, combustor dynamic pressure monitoring unit 315, and/or gas turbine shaft/rotor speed sensor 306 to make a determination about the flame state.

Flame state as used herein means, but is not limited to, whether a flame is ignited, has been ignited in the combustor, or has been extinguished. Flame state determiner 320 can use information in indicator SMP 307 with the first and second derivatives as determined from information produced by some of compressor pressure change determining unit 312, a turbine shaft/rotor speed determining unit 306, gas turbine exhaust temperature change determining 314, combustor dynamic pressure monitoring unit 315, and/or gas turbine shaft/rotor speed sensor 306 noted above. Flame state determiner 320 can use predetermined logic rules to make a judgment about the flame state, as will be described in more detail below.

Figure 6:
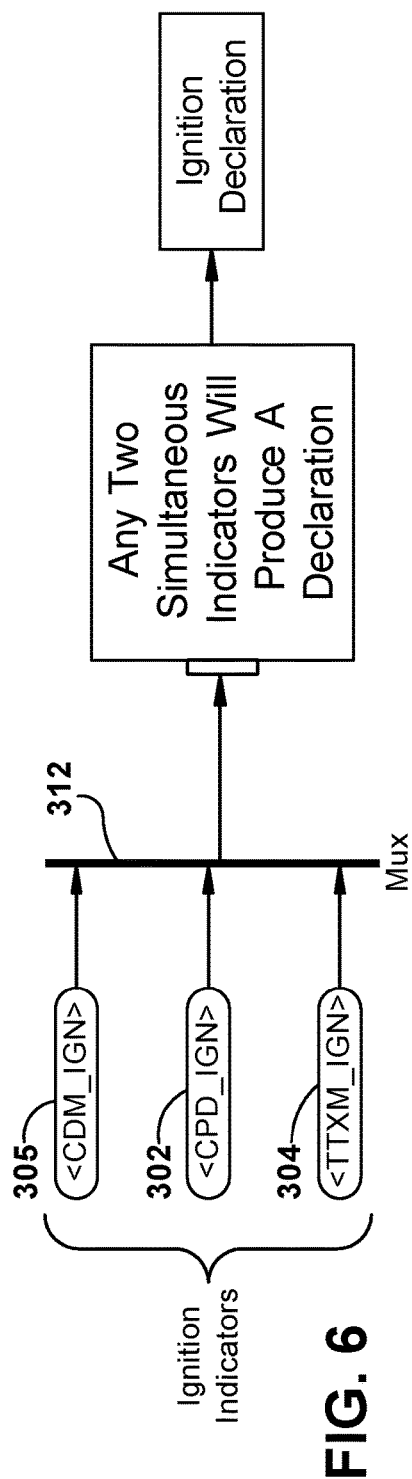
FIG. 6 is a further block diagram illustrating elements of system that can be used to determine an ignition declaration of a combustor of a turbine engine, as embodied by the disclosure.

FIG. 6 is a schematic representation of ignition indication factors analyzation being processed for a declaration of ignition. In FIG. 6, ignition indicators from compressor discharge pressure sensors 302, one or more exhaust gas temperature sensors 304, and combustor dynamic pressure monitor (CDM) 305 are provided to pressure change determination unit 312. If pressure change determination unit 312 determines that any two of compressor discharge pressure sensors 302, one or more exhaust gas temperature sensors 304, and combustor dynamic pressure monitor (CDM) 305 produce simultaneous indications of ignition, system will provide an overall indication of "ignition declaration."

Figure 7:
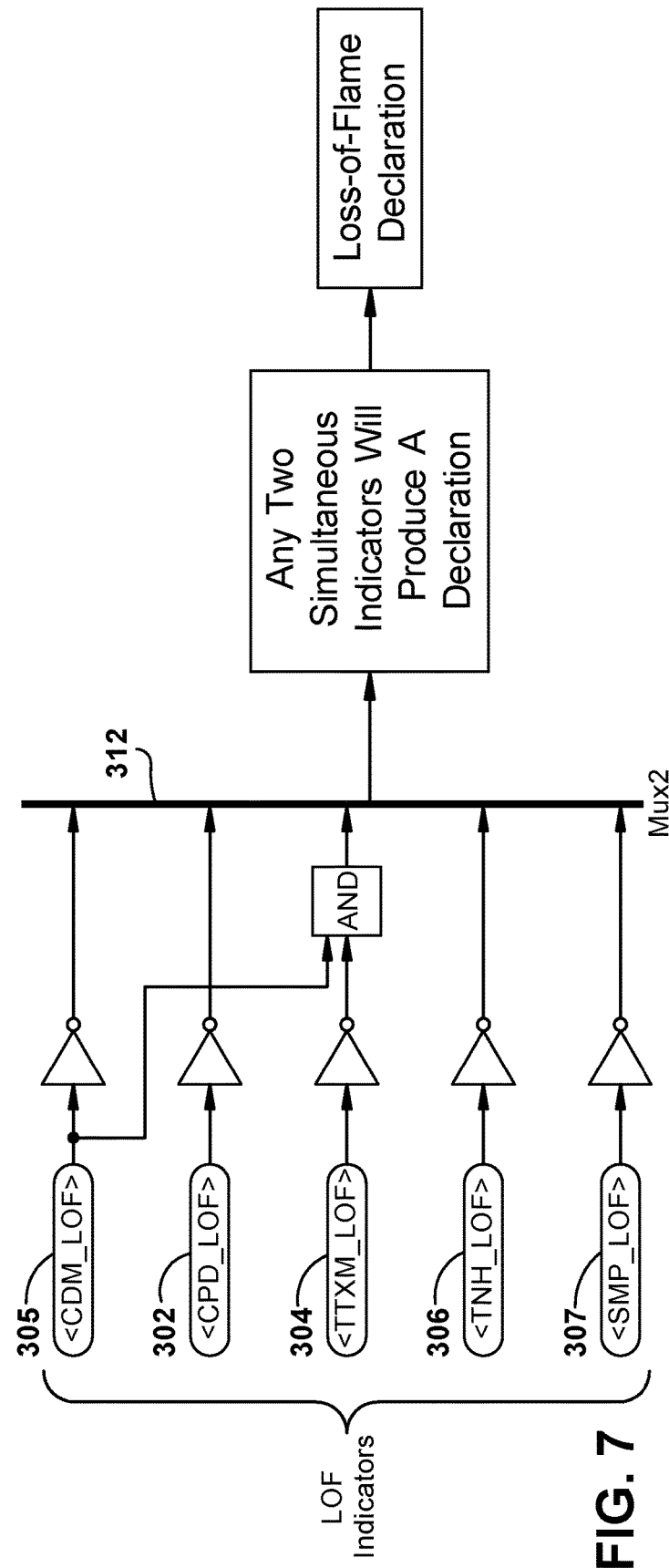
FIG. 7 is a further block diagram illustrating elements of system that can be used to determine a loss of flame declaration of a combustor of a turbine engine, as embodied by the disclosure.

FIG. 7 illustrates a representation of ignition indication factors analyzation being processed for a declaration of loss of flame (LOF). In FIG. 6, ignition indicators from compressor discharge pressure sensors 302, one or more exhaust gas temperature sensors 304, combustor dynamic pressure monitor (CDM) 305, one or more turbine shaft/rotor speed sensors 306, and indicator SMP 307 are provided to pressure change determination unit 312. If pressure change determination unit 312 determines that any two of compressor discharge pressure sensors 302, one or more exhaust gas temperature sensors 304, and combustor dynamic pressure monitor (CDM) 305, one or more turbine shaft/rotor speed sensors 306, and indicator SMP 307 produce simultaneous indications of ignition, system will provide an overall indication of "loss of flame."

Figure 5:
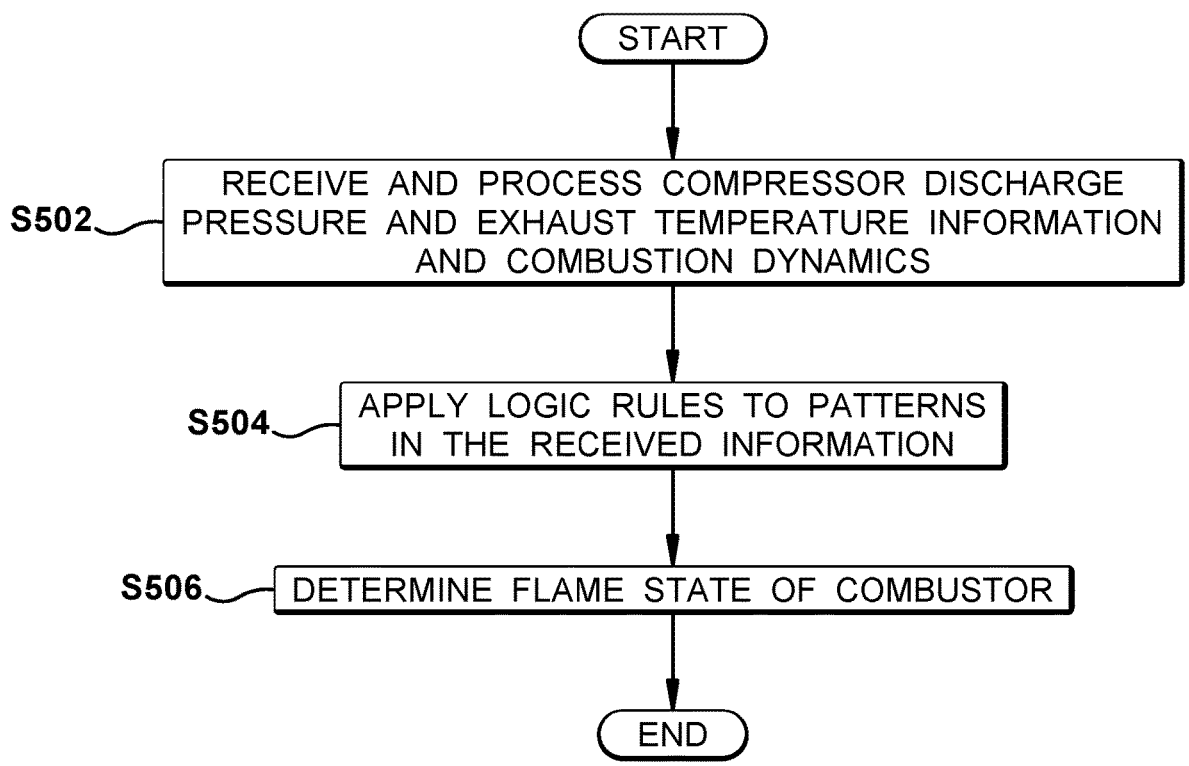
FIG. 5 is an example flow chart illustrating steps of a method of determining a flame state of a combustor of a turbine engine, as embodied by the disclosure.

FIG. 5 provides a flow diagram of an operational methodology according to embodiments of the disclosure. As shown in FIG. 5, the method begins in process S502, where a combustor flame state determination unit 310 receives and processes information regarding combustion dynamics, compressor discharge pressure, gas turbine shaft/rotor speed, and gas turbine exhaust gas temperature. As explained above, combustor flame state determination unit 310 receives and processes information that may include receiving combustor dynamic pressure, compressor discharge pressure, gas turbine shaft/rotor speed, and gas turbine exhaust gas temperature, as well as calculated first and second derivatives of those values.

In process S504, the patterns in the received information are examined and compared to logic rules. For example, if any two of the first and/or second derivatives of combustor dynamic pressure, compressor discharge pressure, gas turbine shaft/rotor speed, and gas turbine exhaust gas temperature are simultaneously trending in opposite directions, this may indicate that the turbine is operating with loss of flame and/or without ignition. However, if the first and/or second derivatives of any two of the combustor dynamic pressure, compressor discharge pressure, gas turbine shaft/rotor speed, and gas turbine exhaust gas temperature are negative over the same predetermined period of time, this would indicate that the flame in the combustor has been extinguished.

Similarly, the first and/or second derivatives of combustor dynamic pressure, compressor discharge pressure, gas turbine shaft/rotor speed, and gas turbine exhaust gas temperature are positive over the same predetermined period of time, this would indicate that a flame ignition event has occurred.

Finally, in process S506, the flame state determiner 120 makes a determination about whether a flame has ignited in the combustor or whether a flame has been extinguished in the combustor based on the result of analysis that is performed in process S504. As noted above, other information from other elements, including indicator SMP 307 and combustor dynamic pressure monitoring, may also be used to make such a determination.

The logic rules used by the flame state determiner 120 to make a judgment about whether a flame has just ignited in combustor or whether a flame has just been extinguished in combustor are based upon how the characteristics of compressor discharge pressure, gas turbine shaft/rotor speed, and gas turbine exhaust gas temperature change during flame ignition events and flame extinguishing events, as illustrated in FIGS. 1 and 2.

The determining of whether a flame ignition event has occurred can be based on both the fact that first and/or second derivatives of combustor dynamic pressure, compressor discharge pressure, gas turbine shaft/rotor speed, and gas turbine exhaust gas temperature are increasing, and based on whether the absolute values of the derivatives are above threshold values. Similarly, a determination that a flame has been extinguished may be based on the fact that first and/or second derivatives of combustor dynamic pressure, compressor discharge pressure, gas turbine shaft/rotor speed, and gas turbine exhaust gas temperature are negative, and based on whether the values of the first and second derivative are below threshold values.

As explained above, by monitoring the characteristics of combustor dynamic pressure, compressor discharge pressure, gas turbine shaft/rotor speed, combustor dynamic pressure, and gas turbine exhaust gas temperature, it is possible to determine the state of the flame in a combustor of a turbine engine without using optical detectors. Also, the determination of the flame state can be made using information about the turbine engine that is already being monitored. Thus, no additional sensors or sensor-based equipment need be added to replace the optical sensor that is being eliminated.

A further aspect, as embodied by the disclosure, provides for determination of loss of flame (LOF) indicators. FIG. 6 illustrates a system that is capable of determining flame state, including ignition indicators and FIG. 7 illustrates a system that is capable of determining loss of flame (LOF), as embodied by the disclosure. In one aspect, the system, as embodied by the disclosure, includes a combustor flame state determination unit 310, which is operatively coupled to one or more compressor discharge pressure sensors 302 and one or more exhaust gas temperature sensors 304. Combustor flame state determination unit 310 is further operatively coupled to a combustor dynamic pressure monitor (CDM) 305. In this embodiment, if two or more of combustor flame state determination unit 310, compressor discharge pressure sensors 302, and combustion dynamics monitor 305 provide simultaneous indications of possible lack of ignition and/or loss of flame (LOF), a determination can be made.

In another aspect illustrated in FIG. 7, as embodied by the disclosure, combustor flame state determination unit 310 is coupled to is operatively coupled to one or more compressor discharge pressure sensors 302, one or more exhaust gas temperature sensors 304, one or more combustor dynamic pressure monitors 305, and also operatively coupled to one or more turbine shaft/rotor speed sensors 306, and indicator SMP 307. To indicate a loss of flame, characteristics/values of combustion dynamics, exhaust gas temperature, turbine shaft/rotor speed, and compressor discharge pressure are analyzed together with indicator SMP 307. As above, if any two of these characteristics (e.g., combustion dynamics, exhaust gas temperature, compressor discharge pressure, HP rotor/shaft speed, etc.), and indicator SMP 307 simultaneously indicate possible lack of ignition and loss of flame (LOF), a determination that loss of flame (LOF) has occurred can be made.

As will be appreciated, the methodology and system, as embodied by the disclosure, can be provided as a system and/or method utilizing combustor flame state determination unit 310. As embodied by the disclosure, combustor flame state determination unit 310 may include a computer program product. Moreover, combustor flame state determination unit 310 may take the form of an entirely hardware embodiment, an entirely software embodiment (including firmware, resident software, micro-code, etc.), or an embodiment combining software and hardware. Furthermore, combustor flame state determination unit 310 may include a computer program product embodied in any tangible medium of expression having computer-usable program code embodied in the medium to perform the process, as embodied by the disclosure.

As embodied by the disclosure, process is described below with reference to systems (FIG. 3) and a flowchart (FIG. 5), illustrations, and/or block diagrams. It will be understood that each block of the flowchart illustrations and/or block diagrams, and combinations of blocks in the flowchart illustrations and/or block diagrams, can be implemented by computer program instructions. These computer program instructions may be provided in a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As discussed herein, various systems and components are described as "obtaining" data for the determination and detection, as embodied by the disclosure. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. As used herein, "approximately" indicates +/−10% of the value, or if a range, of the values stated. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of determining a flame state of a combustor of a turbine engine, comprising:
   determining at least one of a first derivative and a second derivative of a compressor discharge pressure of a compressor of the turbine engine;
   determining at least one of a first derivative and a second derivative of a gas turbine exhaust gas temperature of the exhaust gases output by the turbine engine;
   determining at least one of a first derivative and a second derivative of a gas turbine shaft/rotor speed of the turbine engine;
   determining at least one of a first derivative and a second derivative of combustor dynamic pressure; and
   determining a flame state of a combustor of the turbine engine based on combustor dynamic pressure, compressor discharge pressure, gas turbine shaft/rotor speed, and gas turbine exhaust gas temperature of the exhaust gases.

2. The method of claim 1, wherein the determining a flame state of the combustor includes determining that a flame has ignited in the combustor whether at least two of the first derivative of the compressor discharge pressure of the compressor, the first derivative of the gas turbine exhaust gas temperature, and the first derivative of the gas turbine shaft/rotor speed are positive during a predetermined period of time, and at least one of the first derivative of the compressor discharge pressure of the compressor, the first derivative of the exhaust gas temperature, and the first derivative of the gas turbine shaft/rotor speed is greater than a threshold value.

3. The method of claim 1, wherein the step of determining a flame state of the combustor includes determining that a flame has ignited in the combustor whether at least two of the first derivative of the compressor discharge pressure of the compressor, the first derivative of the temperature of the exhaust gases, and the first derivative of the gas turbine shaft/rotor speed are positive during at least portions of a predetermined period of time, and wherein the gas turbine shaft/rotor speed is greater than a preset threshold value, the first derivative of the compressor discharge pressure of the compressor is greater than a first threshold value and the first derivative of the exhaust gas temperature is greater than a second threshold value during the predetermined period of time.

4. The method of claim 1, wherein the step of determining a flame state of the combustor includes determining that a flame has ignited in the combustor whether at least two of the first derivative of the compressor discharge pressure of the compressor and the first derivative of the exhaust gas temperature of the exhaust gases, and the first derivative of the gas turbine shaft/rotor speed are positive during at least a portion of the same predetermined period of time.

5. The method of claim 1, wherein the step of determining a flame state of the combustor includes determining that a flame has ignited in the combustor whether the first derivative of the compressor discharge pressure of the compressor is positive during a first portion of a predetermined period of time and the first derivative of the exhaust gas temperature of the exhaust gases is positive during a second portion of the predetermined period of time, the second portion being subsequent to the first portion.

6. The method of claim 1, wherein the step of determining a flame state of the combustor includes determining that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during portions of a predetermined period of time, and at least one of the first derivative of the compressor discharge pressure of the compressor, the first derivative of the exhaust gas temperature of the exhaust gases, and the first derivative of gas turbine shaft/rotor speed is below a threshold value.

7. The method of claim 1, wherein the step of determining a flame state of the combustor includes determining that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during portions of a predetermined period of time, the first derivative of the compressor discharge pressure of the compressor is smaller than a first threshold value during a portion of the predetermined period of time, and the first derivative of the exhaust gas temperature of the exhaust gases is smaller than a second threshold value during a portion of the predetermined period of time.

8. The method of claim 1, wherein the first determining step includes determining the first and second derivatives of the compressor discharge pressure of the compressor, wherein the second determining step includes determining the first and second derivatives of the exhaust gas temperature of the exhaust gases output by the turbine engine, wherein the third determining step includes determining first and second derivatives of the gas turbine shaft/rotor speed and wherein the step of determining a flame state of a combustor of the turbine engine is based on the determined first and second derivatives of the compressor discharge pressure, exhaust gas temperature of the exhaust gases, and the first derivative of the gas turbine shaft/rotor speed.

9. The method of claim 8, wherein the step of determining a flame state of the combustor includes determining that a flame has ignited in the combustor whether at least two of the first and second derivatives of the compressor discharge pressure of the compressor, the first and second derivatives of the exhaust gas temperature of the exhaust gases, and the first and second derivatives of the gas turbine shaft/rotor speed are positive over portions of a predetermined period of time.

10. The method of claim 8, wherein the step of determining a flame state of the combustor includes determining that a flame has ignited in the combustor whether the first and second derivatives of the compressor discharge pressure of the compressor are positive and above threshold values during a first portion of a predetermined period of time, and whether the first and second derivatives of the exhaust gas temperature of the exhaust gases are positive and above threshold values during a second portion of the predetermined period of time.

11. The method of claim 8, wherein the step of determining a flame state of the combustor includes determining that a flame has been extinguished in the combustor whether at least two of the first and second derivatives of the compressor discharge pressure of the compressor and the first and second derivatives of the exhaust gas temperature of the exhaust gases are negative over at least portions of a predetermined period of time.

12. A system for determining a flame state of a combustor of a turbine engine, the system comprising: a pressure change determining unit; a temperature change determining unit; a gas turbine shaft/rotor speed unit; combustor dynamic pressure monitoring; a flame state determining unit; and a non-transitory computer-readable medium comprising computer-executable instructions for operating a gas turbine, the instructions including instruction for:

determining at least one of a first derivative and a second derivative of a compressor discharge pressure of the compressor of the turbine engine;

determining at least one of a first derivative and a second derivative of an exhaust gas temperature of the exhaust gases output by the turbine engine;

determining at least one of a first derivative and a second derivative of a combustion gas turbine shaft/rotor speed;

determining at least one of a first derivative and a second derivative of combustion monitoring, and determining a flame state of a combustor of the turbine engine based on the determined derivatives of the combustion monitoring, compressor discharge pressure of the compressor, the determined exhaust gas temperature of the exhaust gases, and the determined derivatives of the gas turbine shaft/rotor speed.

13. A system for determining a flame state of a combustor of a turbine engine, comprising:

a pressure change determining unit that determines at least one of a first derivative and a second derivative of the compressor discharge pressure of the compressor of the turbine engine;

a temperature change determining unit that determines at least one of a first derivative and a second derivative of the exhaust gas temperature of the exhaust gases output by the turbine engine;

a gas turbine shaft/rotor speed unit that determines at least one of a first derivative and a second derivative of the gas turbine shaft/rotor speed; and a combustor dynamic pressure monitoring unit that determines at least one of a first derivative and a second derivative of combustion dynamics; wherein a flame state determining unit that determines a flame state of a combustor of the turbine engine based on outputs of the pressure change determining unit, the temperature change determining unit, the gas turbine shaft/rotor speed and the combustor dynamic pressure monitoring unit.

14. The system of claim 13, wherein the flame state determining unit determines that a flame has ignited in the combustor whether at least two of the first derivative of the compressor discharge pressure of the compressor, the first derivative of the exhaust gas temperature of the exhaust gases, and the first derivative of the gas turbine shaft/rotor speed are positive during at least portions of a predetermined period of time, and at least one of the first derivative of the compressor discharge pressure of the compressor, the first derivative of the exhaust gas temperature of the exhaust gases, and the first derivative of the gas turbine shaft/rotor speed is greater than a threshold value.

15. The system of claim 13, wherein the flame state determining unit determines that a flame has ignited in the combustor whether at least two of the first derivative of the compressor discharge pressure of the compressor the first derivative of the exhaust gas temperature of the exhaust gases, and the first derivative of the gas turbine shaft/rotor speed are positive during at least portions of a predetermined period of time, the first derivative of the compressor discharge pressure of the compressor is greater than a first threshold value, the first derivative of the exhaust gas temperature of the exhaust gases is greater than a second threshold value, and the first derivative of the gas turbine shaft/rotor speed is greater than a third threshold value.

16. The system of claim 13, wherein the flame state determining unit determines that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during at least portions of a predetermined period of time, and at least one of the first derivative of the compressor discharge pressure of the compressor, the first derivative of the exhaust gas temperature of the exhaust gases, and the first derivative of the gas turbine shaft/rotor speed is lower than a threshold value.

17. The system of claim 13, wherein the flame state determining unit determines that a flame has been extinguished in the combustor whether at least two of the first derivative of the compressor discharge pressure of the compressor, the first derivative of the exhaust gas temperature of the exhaust gases, and the first derivative of the gas turbine shaft/rotor speed are negative during at least portions of a predetermined period of time, the first derivative of the compressor discharge pressure of the compressor is lower than a first threshold value during a portion of the predetermined period of time, and the first derivative of the exhaust gas temperature of the exhaust gases is lower than a second threshold value during a portion of the predetermined period of time.

18. The system of claim 13, wherein the pressure change determining unit also determines the first and second derivatives of the compressor discharge pressure of the compressor, wherein the temperature change determining unit determines both the first and second derivatives of the exhaust gas temperature of the exhaust gases, and wherein the flame state determining unit determines a flame state of a combustor of the turbine engine based on the determined first and second derivatives of the compressor discharge pressure of the compressor, the temperature of the exhaust gas gases, and the gas turbine shaft/rotor speed.

19. The system of claim 18, wherein the flame state determining unit determines that a flame has ignited in the combustor whether at least two of the first and second derivatives of the compressor discharge pressure of the compressor, the first and second derivatives of the exhaust gas temperature of the exhaust gases, and the first and second derivatives of the gas turbine shaft/rotor speed are positive during at least portions of a predetermined period of time.

20. The system of claim 18, wherein the flame state determining unit determines that a flame has been extinguished in the combustor whether at least two of the first and second derivatives of the compressor discharge pressure of the compressor, the first and second derivatives of the exhaust gas temperature of the exhaust gases, and the first and second derivatives of the gas turbine shaft/rotor speed are negative during at least portions of a predetermined period of time.

* * * * *